United States Patent [19]

Kobayashi

[11] 4,279,493

[45] Jul. 21, 1981

[54] CAMERA STRUCTURE

[75] Inventor: Haruo Kobayashi, Toyokawa, Japan

[73] Assignee: Minolta Camera Kabushiki Kaisha, Osaka, Japan

[21] Appl. No.: 129,977

[22] Filed: Aug. 10, 1979

[30] Foreign Application Priority Data

Dec. 13, 1977 [JP] Japan .................. 52-168075[U]

[51] Int. Cl.³ .............................................. G03B 3/00
[52] U.S. Cl. .................................................. 354/197
[58] Field of Search ........................................ 354/197

[56] References Cited

U.S. PATENT DOCUMENTS

| 3,890,626 | 6/1975 | Ettischer | 354/197 |
| 3,903,537 | 9/1975 | Ettischer | 354/197 |
| 3,925,797 | 12/1975 | Ettischer | 354/197 |
| 4,038,671 | 7/1977 | Schroder et al. | 354/197 |

FOREIGN PATENT DOCUMENTS

| 2330265 | 1/1975 | Fed. Rep. of Germany | 354/197 |
| 2330266 | 1/1975 | Fed. Rep. of Germany . | |
| 2330267 | 1/1975 | Fed. Rep. of Germany . | |
| 2330268 | 1/1975 | Fed. Rep. of Germany . | |
| 2558276 | 7/1977 | Fed. Rep. of Germany . | |
| 2558277 | 7/1977 | Fed. Rep. of Germany . | |
| 2639488 | 3/1978 | Fed. Rep. of Germany . | |
| 48-75652 | 9/1973 | Japan . | |
| 51-51632 | 12/1976 | Japan . | |
| 52-90029 | 7/1977 | Japan . | |
| 52-138923 | 10/1977 | Japan . | |

Primary Examiner—John Gonzales

[57] ABSTRACT

PCT No. PCT/JP78/00051 Sec. 371 Date Aug. 10, 1979 Sec. 102(e) Date Aug. 10, 1979 PCT Filed Dec. 12, 1978 PCT Pub. No. WO79/00384 PCT Pub. Date Jun. 28, 1979

In a camera having incorporated therein two kinds of photographic lenses respectively selectively settable to a photographic position and a retired position thereof, the camera including an integrally molded camera body which is formed with a film position-determining surface and two lens position-determining surfaces with which respective ends of two kinds of photographic lenses are in contact at different positions with respect to the direction of the camera optical axis, and a space being formed between the two lens position-determining planes for accommodating one of the photographic lenses.

Further, the photographic lenses are urged by springs against the respective position-determining planes at their photographic positions.

9 Claims, 2 Drawing Figures

CAMERA STRUCTURE

DESCRIPTION

1. Technical Field

The present invention relates to a camera structure which includes a plurality of objective lenses capable of being advanced into and withdrawn from the photographic light path.

2. Background Art

Heretofore, there have been proposed many cameras which are provided with a plurality of lenses that are selectively positionable into and out of the photographic light path for enabling the objective lens of the camera to have a different focal length. A typical camera of this type is the so-called turret-type camera which has a plurality of lenses fixedly mounted on a disk which is pivoted on the camera body and which is manually turnable to operatively position the desired lens in the photographic light path. In this camera, however, it has been difficult to determine with high preciseness the position of the lens relative to the camera body, especially with respect to the film-contacting surface of the body, due to errors in mounting the disk on the camera and in the inclination of the disk with respect to the camera body.

Japanese utility model after-examination publication No. Sho 48-23742 discloses a camera wherein a pair of lenses are fixedly mounted on a support plate which is directly and slidably mounted on a camera body to alternatively position the desired lens in the photograpic light path. With this camera, the lens can be positioned more precisely than with the turret-type camera. However, similarly to the turret-type cameras, the lenses are disposed substantially in the same plane.

There have also been proposed cameras which have a plurality of lenses which when in their operative position are located at different positions along the optical axis of the photographic light path. (See, for example, U.S. Pat. Nos. 3,925,797 and 4,038,671, German laid-open Pat. Nos. 2,558,276 (corresponding to Japanese laid-open utility-model application No. Sho 52-90029) and 2,558,277. Of these noted patent or utility model publications, the first one discloses a camera structure in which a lens support is slidable on a pair of guide lods, while the other citations disclose cameras in which lenses are mounted directly or indirectly on a lever which is rockably pivoted on the camera body. In any case, it is difficult to obtain the desired accuracy with respect to the position of the lenses due to errors in measurement made during assembly or errors in measurement when making the parts of the lens support, i.e., since the lenses are supported on a member which is made separately of the camera body and which is mounted on the camera body during camera assembly.

The object of the present invention is to provide a camera structure which is provided with a plurality of lenses selectively settable to their respective operative positions, which positions are different along the camera optical axis, the camera movably supporting the lenses such that the accuracy of the position of the lenses relative to a film-contacting surface of the camera body is ensured.

SUMMARY OF THE INVENTION

The camera according to the present invention has incorporated therein two kinds of photographic lenses which are selectively settable to their respective operative and retired positions, the camera comprising a camera body molded to be integrally formed with a film-contacting surface, a first lens position-determining plane with which the rear end of the first photographic lens unit comes into contact and a second lens position-determining plane with which the rear end of the second photographic lens unit comes into contact, with the first and second lens position-determining planes being formed at different locations along the camera optical axis to form between the planes a space in which the first photographic lens can be accommodated, and the camera further comprising biasing members for urging the photographic lenses to the respective lens position-determining planes when the lenses are set to their operative position.

It is to be noted that the words "photographic lens" should not be interpreted to mean only the lenses that form, by themselves, an image of an object to be photographed, because one of the photographic lenses may be a conversion lens, or else an afocal lens system utilized only for the purpose of changing the magnification or the focal length of the other lens. It is also to be noted that the photographic lens unit may comprise a photographic lens system and a support frame for supporting the lens system, and may further comprise an outer frame supporting the support frame in a manner enabling the axial movement of the support frame, as the case may be. The lens unit may be provided with a coupling member or the like to be interconnected with a focusing device and/or a lens-exchanging device.

According to the present invention as mentioned above, since the film-contacting plane and the contacting planes for the plurality of lenses are formed on a integrally molded camera body, the relative positions among the planes can be controlled to a high accuracy. In addition, the lenses are urged at their operative position to the contact plane by a spring, so that the accuracy or preciseness of the lens position is sufficiently ensured. Further, the camera construction is simple and the camera body itself can be molded, so that the camera is suitable for mass production wherein cameras which are less expensive but made with a constant preciseness can be provided.

DETAILED DESCRIPTION OF THE PREFERRED EMBODIMENT

Figure 1:
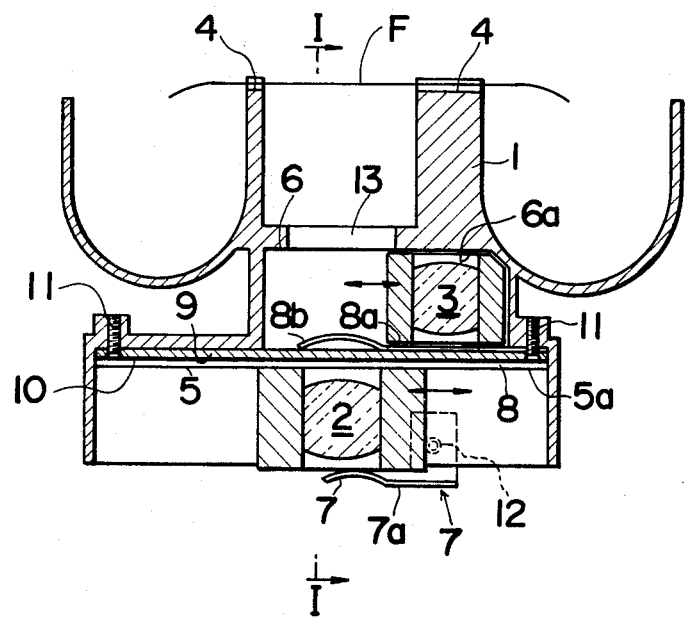
FIG. 1 shows a schematic horizontal sectional view of a camera constructed according to one embodiment of the present invention.
Figure 2:
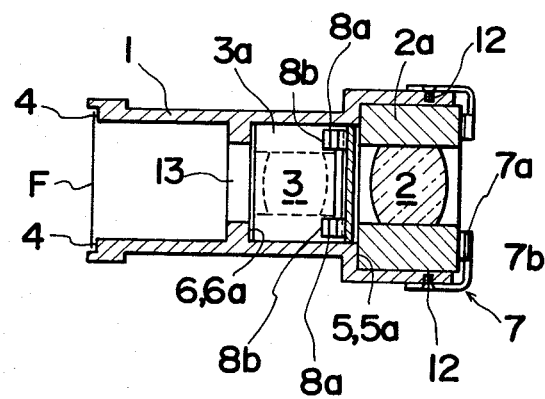
FIG. 2 is a fragmentary vertical sectional view taken along line I—I in FIG. 1.

With reference to the Figures, a camera body 1 is shown having two kinds of lenses with different focal distances, i.e., a telephoto lens 2 and a wide angle lens 3, which lenses are alternatively positionable in the photographic optical path. Camera body 1 has film position-determining plane 4 in the rear of exposure aperture portion 13 for determining the position of film F, and lens position-determring planes 5 and 6 ahead of the exposure aperture position for determining the respective positions of the aforementioned lenses 2 and 3. With respect to the film position-determining plane, the film position is determined indirectly by the plane against which a portion of a film cartridge bears, in case the camera is designed for use with a film contained in a cartridge, such as a 110 size film. Camera body 1 is molded of aluminum or a synthetic resin or a thermo-plastic material, with the position-determining planes 4, 5 and 6 being formed thereon. Lens position-determining planes 5 and 6 are formed integrally with and continuously with guide planes 5a and 6a which are used for the advancement and withdrawal of the lenses into and out of the photographic light path.

Spring 7 and 8 are provided for respectively urging lens 2 and 3 against lens position-determining plane 5 and 6 when each of the lens 2 and 3 is located at its operative position in the photographic light path. Spring 8 is formed as a leaf spring which is secured by screw 11 together with shutter-supporting plate 10 to mounting surface 9, which in turn recedes from the lens position-determining plane. The leaf spring via the curved tips 8b of its tongue shaped pieces 8a urges, lens support frame 3a at its opposite upper and lower portions. Spring 7 is composed of a pair of leaf springs having their base portions secured to the outer surface of camera body 1 by screw 12. The leaf springs, via the curved tips 7b of their torque portion 7a, urge lens-supporting frame 2a at its opposite upper and lower portions. On shutter supporting plate 10 are mounted diaphragm-shutter blades or a combination of diaphragm blades and shutter blades.

Lenses 2 and 3 can be advanced into and withdrawn from the photographic light path freely, being guided separately by guide plane 5a and lens position-determining plane 5 or guide plane 6a and lens position-determining plane 6. Practically, lenses 2 and 3 are alternatively located in the photographic light path in response to movement of an operating member (not shown). Lenses 2 and 3, being urged by spring 7 and 8 against lens position-determining planes 5 and 6, occupy respectively a predetermined axial position at their operative positin. As the lens position-determining planes 5 and 6 are formed integrally with the film position-determining plane 4, with the planes 5 and 6 having proper parallel relationships and proper relative distances with respect to the film position-determining plane 4, lenses 2 and 3, whose positions are controlled by the planes 5 and 6, can be located with extremely high accuracy of parallelism and distance with respect to the plane of film F, i.e., the focal plane, determined by the determining plane 4.

So far as accuracy is concerned, three position-determining planes 4, 5 and 6 may be determined satisfactory if they are integrally formed. However, if they are designed to be formed on a single molded body, they can be formed simultaneously upon the molding of a camera body, so that they will be suitable for mass production and so that uniform and stable accuracy for their position will be ensured.

As to the lens position-determining planes 5 and 6, it may be enough if they can determine the position of lenses 2 and 3 at their operative position. Thus, guide planes 5a and 6a may be formed on a member or members different from the camera body.

It may also be enough for springs 7 and 8 to urge the lenses 2 and 3 at their operative position, but they may be formed to urge respectively the lenses 2 and 3 against lens position-determining plane 5 or 6 and guide plane 5a or 6a throughout the stroke of the advancement and retirement of the lenses 2 and 3 so that the latter may be stabilized during their movement and when stopped within and outside of the photographic light path.

Moreover, lenses 2 and 3 may be stably positioned at every displaced position if the curved tips 7b and 8b of springs 7 and 8 are formed to function as click stops.

It is to be noted that the positional accuracy of the focal plane relative to lenses 2 and 3 will be the same even in the case of cameras using cartridge film wherein the casing of a film cartridge bears against the film position-determining plane and the film position is determined through the casing.

It will be apparent to those skilled in the art that the present invention is applicable irrespectively of the kind of lenses to be advanced to and retired from the photographic light path.

I claim:

1. In a camera which has incorporated therein two kinds of photographic lenses which are selectively settable to an operative position and a retired position thereof, the camera structure characterized by comprising a camera body integrally molded to be formed with a film position-determining plane, a first lens position-determining plane with which the rear end of the first photographic lens unit is in contact, and a second lens position-determining plane with which the rear end of the second photographic lens unit is in contact, said first and second lens position-determining planes being formed parallel with each other and at different levels with respect to the photographic optical axis of the camera, and both facing forward.

2. The camera set forth in claim 1 wherein said camera includes biasing means for respectively urging said photographic lenses to said lens position-determining planes when said lenses are set to their operative positions.

3. The camera set forth in claim 2 wherein said camera body further comprises a cassette receptacle for receiving a film cassette which has its predetermined position to be in contact with said film position determining plane.

4. The camera set forth in claim 2 wherein said camera body has guide planes for respective photographic lenses, said guide planes being formed to continuously connect to said respective lens position determining planes.

5. The camera set forth in claim 2 wherein a camera objective diaphragm is mounted adjacent to said second lens position-determining plane.

6. The camera set forth in claim 2 wherein said photographic lenses can be used independently, have different focal lengths, and are alternatively settable to operative positions thereof.

7. The camera set forth in claim 2 wherein a diaphragm and a shutter mechanism are arranged adjacent to said second lens position-determining plane.

8. A camera which includes two lenses that are selectively positionable in the photographic optical path at different points therealong, said camera including
an integrally molded body which has a rear surface, a first internal surface facing oppositely to said rear surface and a second internal surface facing oppositely to said rear surface; said rear surface forming a plane for the film in the camera and including an aperture aligned with the photographic optical axis; said first internal surface forming a first lens position-determining plane and including an aperture aligned with the photographic optical axis; and said second internal surface forming a second lens position-determining plane and including an aperture aligned with the photographic optical axis, said second lens position-determining plane being parallel to said first lens position-determining plane;

a first photographic lens unit including a first photographic lens, said first photographic lens, said first photographic lens unit being positioned in said body to contact said first internal surface and slide generally transversely of said photographic optical axis to position said first photographic lens in and out of said photographic optical axis; and a second photographic lens unit including a second photographic lens, said second photographic lens unit being positioned in said camera body to contact said second internal surface and slide generally transversely of said photographic optical axis to position said second photographic lens in and out of said photographic optical axis.

9. The camera as set forth in claim 8, further including first biasing means for urging said first photographic lens towards said first lens position-determining plane when said first photographic lens unit is moved such that said first photographic lens is operatively positioned in the photographic optical axis, and second biasing means for urging said second photographic lens towards said second lens position-determining plane when said second photographic lens unit is moved such that said second photographic lens is operatively positioned in the photographic optical axis.

* * * * *